UNITED STATES PATENT OFFICE.

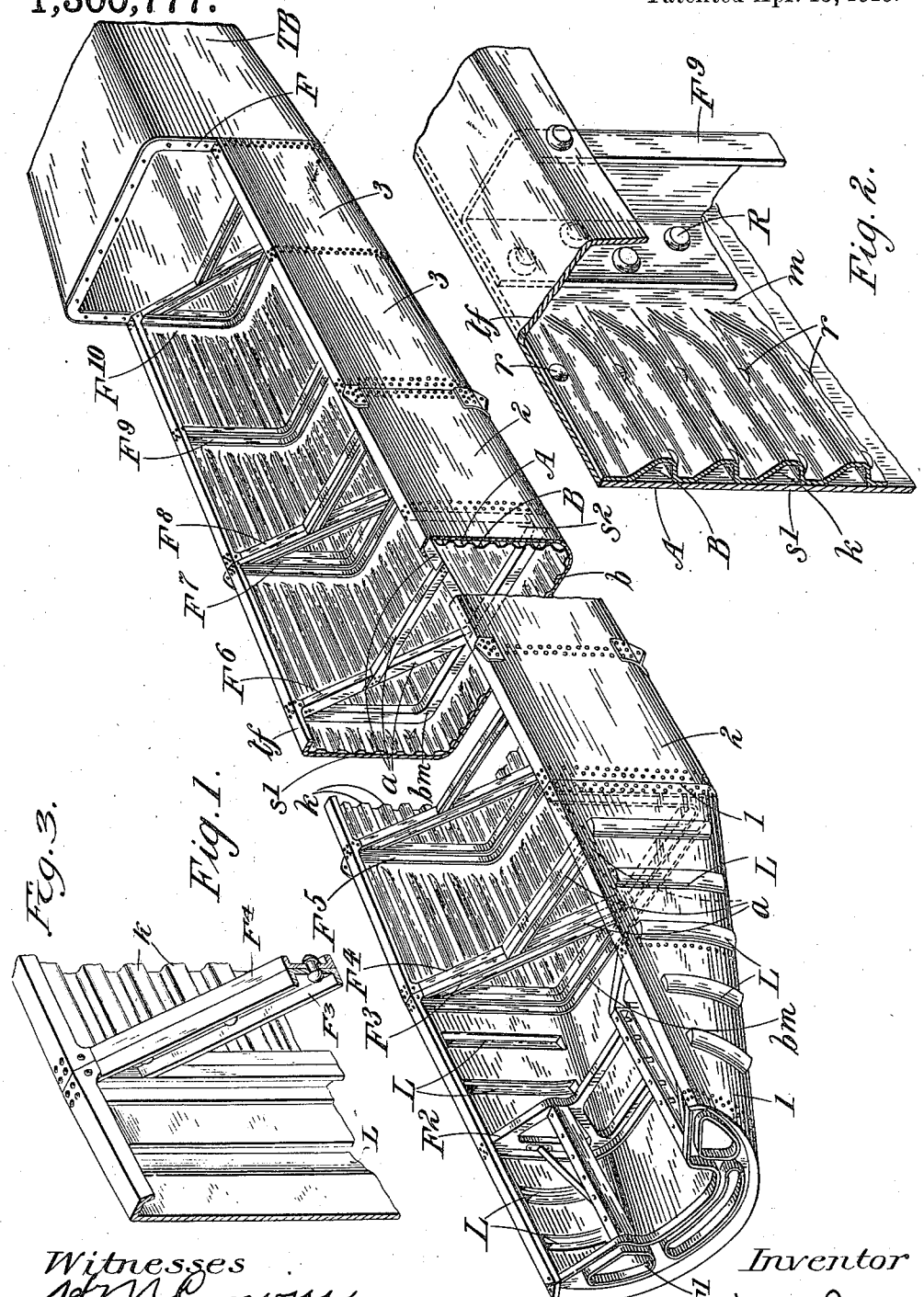

WILFRID THOMAS REID, OF BRISTOL, ENGLAND, ASSIGNOR OF ONE-HALF TO THE BRITISH & COLONIAL AEROPLANE COMPANY LIMITED, OF BRISTOL, ENGLAND.

AIRCRAFT-FUSELAGE.

1,300,777. Specification of Letters Patent. Patented Apr. 15, 1919.

Application filed March 19, 1918. Serial No. 223,279.

*To all whom it may concern:*

Be it known that I, WILFRID THOMAS REID, a subject of the King of England, residing at Bristol, Gloucestershire, England, have invented certain new and useful Improvements in Aircraft-Fuselages, of which the following is a specification.

This invention relates to a construction of aircraft fuselage which is sectional and is composed of units each small enough and light enough to be conveniently transportable. By the employment of such units, on each of which its contents or equipment (so far at any rate as minor detail is concerned) is fixed in place before the unit leaves the works, the erection of a machine in the field or the replacement of a damaged unit by a new one is greatly expedited and facilitated.

A sectional fuselage according to the present invention comprises trough-sections, such as 1, 2 or 3 hereinafter described, each such section made up of two sheets, one of said sheets being corrugated and attached to the companion sheet to stiffen the latter, and it also preferably comprises transverse frames such as are exemplified in the accompanying drawings.

An improved fuselage according to the present invention is illustrated in the accompanying drawings, wherein:—

Figure 1 is a perspective view of the fuselage with some of the parts broken through so as to show in section;

Fig. 2 is a perspective view of a portion of Fig. 1 to a scale larger than that of the said Fig. 1.

Fig. 3 is a perspective view of a detail portion of the structure.

Like numerals and letters indicate like parts throughout the drawings.

The fuselage illustrated is of trough shape, comprising sections 1, 2 and 3 of the trough succeeding one another in the order named, in the length of the fuselage, each section or unit being made up of two connected sheets (say of aluminum) A and B (see Fig. 2) one A bent to form a bottom $b$ and two side walls $s^1$ $s^2$ and horizontal top flanges $tf$ integral with the latter, and the second sheet B being arranged to line or coat the first as in Fig. 2, and having corrugations $k$ which are parallel to the length of the trough, and stiffen it. The corrugations may merge, as shown in Fig. 2, into the flat portions of the end margin $m$ of the sheet B and the two sheets are permanently connected together, as by the rivets $r$. Each section comprises also stamped transverse channel frames $F^1$ to $F^{10}$ inclusive, of steel or other suitable material to which the pair of united sheets is permanently attached, e. g. by rivets R as shown in Fig. 2, some of the said frames being so situated at the ends of their sections as there to present each a flat face so disposed as to abut against correspondingly-disposed flat faces on the end frame of the next section. Two frames thus abutting are $F^3$ $F^4$, and also $F^7$ $F^8$. The several sections are detachably connected to one another by connecting with removable bolts (not shown in the drawings) the abutting frames in a manner well understood.

A convenient form of transverse frame for the purposes of the present invention is a construction of a wide U-form having a flat bottom member $bm$ as in the frames $F^3$ $F^4$ for example, with a member shaped like an inverted A (the parts $a$ in the frame $F^3$ for example) which is united to (and preferably integral with) the middle and ends of the U-shaped portion.

The transverse frames in the leading section or unit 1 can be shaped as shown, to receive a radiator or engine or other apparatus. The leading section 1 is shaped as a bow or nose and may have air-louvers L struck up on it or fixed to it. The leading section 1 can be lined with a corrugated sheet. The lining is omitted from the drawing, but it would be like the lining of the other sections 2 and 3 and openings opposite the air-louvers L would be cut through the corrugations in it.

The after transverse frame $F^{10}$ of the after unit 3 is bolted to the forward-end flange F of the tail-boom TB. Instead of channel section, the frames might be of angle section, any cross-section of frame will serve which provides end flanges for the troughs whereby troughs such as 2 or 3 can be abutted and bolted together.

What I claim as my invention and desire to secure by Letters Patent is:—

1. In an aeroplane-fuselage, the combination of a plurality of trough-shaped separable sections each section comprising a pair of plates fixed together, one plate constituting the trough and the other a lining for it and one being corrugated, flanged ends on each section to abut against corresponding flanged ends on the adjacent sections, and means for connecting the abutted flanged ends to one another.

2. In an aeroplane-fuselage, the combination of a plurality of trough-shaped separable sections each section flanged longitudinally along its upper edges and comprising a pair of plates fixed together, one plate constituting the trough and the other a lining for it and one being corrugated, flanged ends on each section to abut against corresponding flanged ends on the adjacent sections, and means for connecting the abutted flanged ends to one another.

3. In an aeroplane-fuselage, the combination of a plurality of trough-shaped separable sections each section comprising a pair of plates fixed together, one plate constituting the trough and the other a lining for it and one being corrugated, flanged ends on each section constituted by transverse frame-members fixed to the sections to abut against corresponding flanged ends on the adjacent sections, and means for connecting the abutted flanged ends to one another.

4. In an aeroplane-fuselage, the combination of a plurality of trough-shaped separable sections each section comprising a pair of plates fixed together, one plate constituting the trough and the other a lining for it and one being corrugated, flanged ends on each section constituted by a combined U- and inverted A-frame to abut against corresponding flanged ends on the adjacent sections, and means for connecting the abutted flanged ends to one another.

In testimony whereof I affix my signature.

WILFRID THOMAS REID.